May 3, 1927.
J. C. LARSEN
ONION HARVESTER
Filed Feb. 20, 1926
1,627,289
2 Sheets-Sheet 1
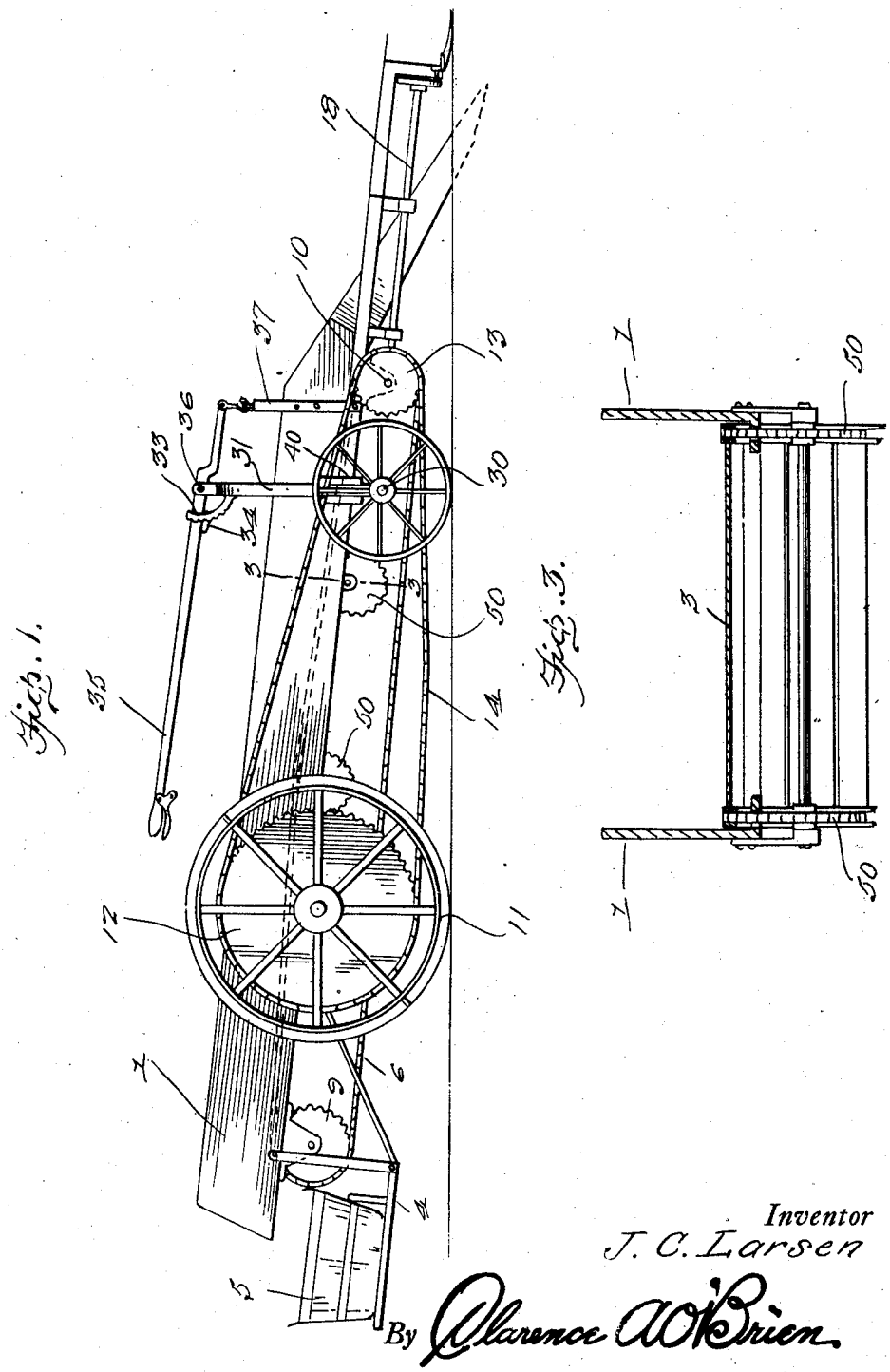
Inventor
J. C. Larsen
By Clarence A. O'Brien
Attorney

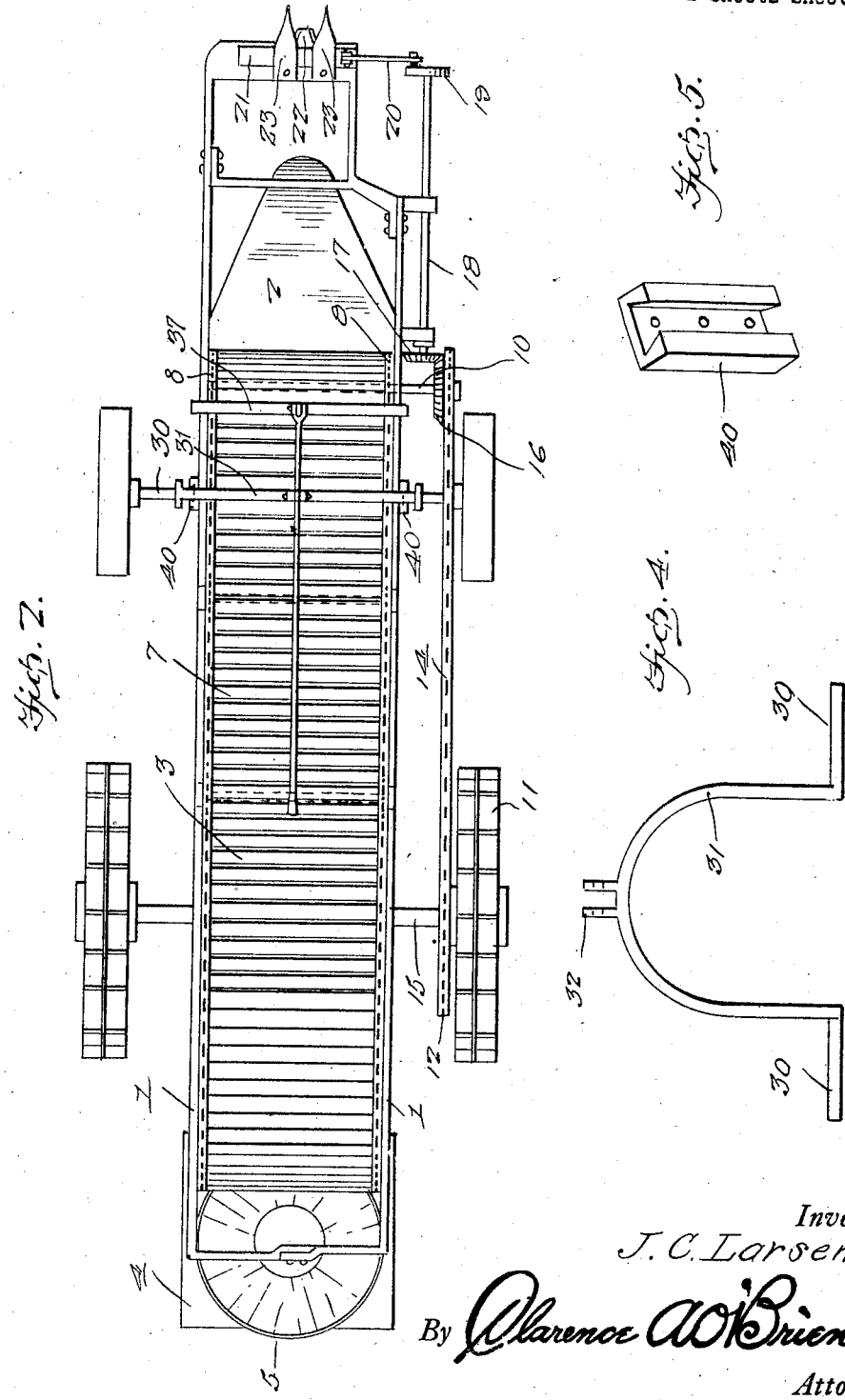

Patented May 3, 1927.

1,627,289

UNITED STATES PATENT OFFICE.

JOHANES CHRISTIAN LARSEN, OF STURTEVANT, WISCONSIN.

ONION HARVESTER.

Application filed February 20, 1926. Serial No. 89,699.

My present invention pertains to harvesting apparatus, and contemplates the provision of a simple, inexpensive and efficient apparatus for topping onions, lifting the onions from the ground, and moving the onions to a receptacle and cleaning the same effectively en route.

With the foregoing in mind, the invention in all of its details will be fully understood from the following description and claim when the same is read in connection with the drawings, accompanying and forming part of this specification, in which:—

Figure 1 is a side elevation illustrating the onion harvester constituting the best practical embodiment of my invention of which I am cognizant.

Figure 2 is a top plan view of the same.

Figure 3 is a transverse section taken in the plane indicated by the line 3—3 of Figure 1.

Figure 4 is a detail front elevation of the front axle yoke comprised in my improvement.

Figure 5 is an enlarged detailed perspective of one of the frame guides complementary to the said yoke.

Similar numerals of reference designate corresponding parts in all of the views of the drawings.

The side members 1 of the main frame of my novel harvester are spaced apart in parallel relation and are provided at their forward ends with a plow 2, said plow being alined with the space between the side members 1 and being declined forwardly and tapered, and having for its function to lift onions from the ground and contribute to the delivery of the onions to an endless apron 3. At the rear end of the main frame of the harvester is an appropriately connected support 4 on which are designed to be removably arranged baskets or other receptacles such as 5. The endless apron 3 is made up of sprocket belts 6, and spaced transverse slats 7, and it is mounted upon forward and rear sprocket gears numbered 8 and 9, respectively. The sprocket gears 8 are fixed to a transverse shaft 10 which is driven from the rear drive wheel 11 of the harvester through the medium of a sprocket gear 12 fixed with respect to said drive wheel, a sprocket gear 13 fixed on the shaft 10, and a sprocket belt 14 mounted on and connecting the gears 12 and 13. Also fixed to the shaft 10 is a miter gear 16 meshed with a miter gear 17 fixed to a longitudinal shaft 18 disposed at one side of the forward portion of the harvester frame, Figures 1 and 2. At its forward end the shaft 18 is provided with a crank disk 19 and connected at one end to said disk 19 is a pitman 20, the other end of which is connected to a transversely reciprocating cutter bar 21, appropriately guided at the forward end of the frame. The blade of the said cutter bar 21 is designated by 22 and is arranged to move transversely directly below combined guard fingers and shoes 23. Said combined guard fingers and shoes 23 are spaced apart for the passage of onion tops therebetween, and are arranged to move on the surface of the ground. This arrangement of the combined guard and shoes is materially advantageous inasmuch as it enables the same to lift tops which are depressed so that the blade 22 may cut the tops in efficient manner from the onions. Subsequently to the topping of the onions, the same are engaged by the plow 2, through the medium of which the onions are carried upwardly to the upper stretch of the apron 3, and on said upper stretch the onions are carried rearwardly and delivered to a basket or receptacle 5.

The plow 2 is designed to be moved with its forward portion penetrating the ground, Figure 1, and for the proper positioning of the plow 2 and the organized mechanism for topping the onions, I provide for the adjustment and adjustable fixture of the forward portion of the frame of the harvester. The said provision will be understood when it is stated that the front, wheeled axle portions 30 of the harvester are equipped with a yoke 31, the said yoke 31 being appropriately connected at its end to the axle portions 30 and being equipped with supstanding standards 32 and with an arcuate toothed bar 33, the latter for cooperation with a detent 34 on a hand lever 35, fulcrumed at 36 between the standards 32 and having its forward arm connected by pendent means, Figure 1, with a bail 37 which, in turn, is connected to the side members 1 of the frame at a point spaced in front of the axle portions 30. The side members 1 of the frame have fixed thereto guide members 40 which receive the side portions of the yoke 31, and this in such manner that the frame may be raised and lowered on the yoke 31. Manifestly by adjustably fixing the hand lever 35, the forward portion of the frame of the harvester together with the plow 2 and the organized topping mechanism, may be adjustably fixed so as to work to the best advantage.

For the shaking of the upper stretch of the endless apron 3 to bring about the separation of dirt from the onions while the same are en route toward the rear end of the harvester, I provide eccentrically mounted sprocket gears 50 in engagement with the sprocket belts of the apron 3. There are four of the said sprocket gears 50, two at each side of the apron 3, and manifestly incident to the rearward movement of the upper stretch of the said apron 3, the wheels 50 will shake the upper stretch and in that way bring about the separation of dirt from the onions, so that the latter will be delivered in a clean state to the basket or receptacle 5.

In the practical operation of my novel harvester, the same is drawn by a tractor or by draft animals across an onion field, and incident to the traverse of the harvester, it will be readily understood that the onions will be topped, and will then be lifted from the ground and delivered by the plow 2 to the upper stretch of the apron 3 by which the onions will be carried rearwardly, and during the said rearward carriage of the onions on the upper stretch of the apron 3, the onions will be cleared of dirt by the cooperation of the wheels 50 with the said upper stretch of the apron, and hence the onions will be delivered in a clean state to the basket or receptacle 5, and in such condition that the onions are adapted to be marketed without further handling.

It will be apparent from the foregoing that my novel harvester is efficient for the purposes stated, and yet is simple and inexpensive in construction and as a whole is well adapted to withstand the usage to which apparatus of corresponding character is ordinarily subjected.

I have entered into a detailed description of the construction and relative arrangement of the parts embraced in the present and preferred embodiment of my invention in order to impart a full, clear and exact understanding of the said embodiment. I do not desire, however, to be limited to the precise construction and relative arrangement of parts as disclosed, my invention being defined by my appended claims within the scope of which modifications in structure and in arrangement may be made without departure from my invention.

Having described my invention, what I claim and desire to secure by Letters-Patent, is:—

The herein described onion harvester comprising a rear axle equipped with ground wheels, a vertically swingable frame mounted on and extending forwardly from said axle and having a transverse bail on its forward portion and an eye at the center of said bail and above the same, wheeled front axle portions, a yoke fixed to said front axle portions, and arranged in transverse straddling relation over the frame and having upright side portions, upright guides carried by the side portions of the frame and receiving and movable up and down on the said upright side portions of said yoke, a longitudinally disposed and central hand lever fulcrumed at an intermediate point of its length on the vertical central portion of the yoke and having on its forward end portion a pendent hook connected with the eye on the transverse bail on the forward portion of the frame, an arcuate rack connected with and disposed rearwardly of the yoke, and a detent on the hand lever and cooperating with said rack.

In testimony whereof I affix my signature.

JOHANES CHRISTIAN LARSEN.